United States Patent
Heuer et al.

[11] Patent Number: 6,067,175
[45] Date of Patent: May 23, 2000

[54] METHOD FOR WHITE BALANCE

[75] Inventors: Axel Heuer, Fahren; Holger Suhr, Kiel, both of Germany

[73] Assignee: Heidelberger Druckmaschinen Aktiengesellschaft, Kiel, Germany

[21] Appl. No.: 09/029,895

[22] PCT Filed: Aug. 27, 1996

[86] PCT No.: PCT/DE96/01586

§ 371 Date: Apr. 30, 1998

§ 102(e) Date: Apr. 30, 1998

[87] PCT Pub. No.: WO97/10671

PCT Pub. Date: Mar. 20, 1997

[30] Foreign Application Priority Data

Sep. 14, 1995 [DE] Germany .......................... 195 34 074

[51] Int. Cl.$^7$ ............................... H04N 1/46; H04N 9/73
[52] U.S. Cl. ............................... 358/516; 348/223
[58] Field of Search ........................ 358/516, 509, 358/520, 523, 527, 531, 518, 530, 537, 505, 474; 348/690, 655, 266, 223, 229, 230; 382/162, 167

[56] References Cited

U.S. PATENT DOCUMENTS

| | | | |
|---|---|---|---|
| 3,772,459 | 11/1973 | Nakajima ................................. | 178/5.4 |
| 4,136,360 | 1/1979 | Ingo Hoffrichter ..................... | 358/523 |
| 4,861,994 | 8/1989 | Saotome et al. ...................... | 250/327.2 |
| 4,907,077 | 3/1990 | Schulz-Hennig et al. .............. | 358/516 |
| 5,146,323 | 9/1992 | Kobori .................................. | 358/527 |
| 5,237,172 | 8/1993 | Lehman et al. ....................... | 250/235 |
| 5,282,024 | 1/1994 | Takei .................................... | 348/223 |
| 5,283,632 | 2/1994 | Suzuki et al. ......................... | 348/223 |
| 5,283,635 | 2/1994 | Suzuki .................................. | 358/516 |
| 5,313,277 | 5/1994 | Suzuki .................................. | 348/223 |
| 5,319,449 | 6/1994 | Saito et al. ........................... | 348/223 |
| 5,790,707 | 8/1998 | Tanaka ................................. | 358/516 |

FOREIGN PATENT DOCUMENTS

| | | |
|---|---|---|
| 25 45 961 | 5/1979 | Germany . |
| 3121846 A1 | 5/1982 | Germany . |
| 0 254 235 | 1/1988 | Germany . |
| 402 1266 | 1/1992 | Japan . |
| 5014712 | 1/1993 | Japan . |
| WO 90/04900 | 5/1990 | WIPO . |

*Primary Examiner*—Madeleine Nguyen
*Attorney, Agent, or Firm*—Hill & Simpson

[57] ABSTRACT

In a method for white balance of an optoelectronic scan unit of a scan apparatus for the image-point-by-image-point and line-by-line scanning of an image original, in a light/voltage converter unit of the scan light, modulated with the densities of the scanned image points, is converted into image values. A white level is predetermined and a white balance is carried out by a reference white of a balance strip. The amplification of the light/voltage converter unit is modified in such a way that the image value produced in scanning the brightest point of the image original, the white point, corresponds to the white level.

11 Claims, 4 Drawing Sheets

METHOD FOR WHITE BALANCE

BACKGROUND OF THE INVENTION

The invention relates to the field of electronic reproduction technology, and concerns a method for white balance in scanning devices for point-by-point and line-by-line scanning of image originals using an optoelectronic scan unit. The scanning devices, also called scanners, can be black/white scanners for scanning black-and-white image originals, or color scanners for scanning color image originals.

In a black/white scanner, a black-and-white image original is illuminated image-point-by-image-point by a light source, and the scan light—modulated corresponding to the brightness values of the scanned image points—is converted by means of an optoelectronic converter into an image signal that represents the brightness values between "black" and "white."

In a color scanner, the scan light coming from the color image original is first split into the color portions "red," "green" and "blue" by means of dichrotic filters, and is supplied to the individual color channels, in which the three color portions of the scan light are then converted into the color signals for "red," "green" and "blue" using optoelectronic converters.

The image signals or, respectively, color signals are digitized in A/D converters, and the digital image values, color values thereby obtained are further processed on-line or are intermediately stored before further processing. The signal preparation stages connected downstream from the optoelectronic converters comprise a defined saturation range, whose maximum signal value is designated the white level.

By means of a white balance of a scanner before the beginning of the scanning, the tonal range of the respective image original to be scanned is matched to the defined saturation range of the signal preparation stages, by using the optoelectronic converter to convert the scan light coming from the brightest point of the image original—the white point—into an image signal value that corresponds to the white level. Since the scan light coming from the brightest point of the image original varies from image original to image original, and the sensitivity of the optoelectronic converter is not constant over a longer period of time, in practice a corresponding white balance is carried out before each document scan, which is particularly expensive in color scanners, since there at least three optoelectronic converters are to be balanced.

In DE-A-25 45 961, a method for automatic white balance in black/white scanners and in color scanners is already indicated. In a calibration phase, the scan unit of a black/white scanner is positioned at the respective white point of the image original, and the scan light coming from the white point that is approached is converted into an image signal actual value in the optoelectronic converter. In a control apparatus, the image signal actual value is compared with an image signal target value that corresponds to the defined white level. A control signal modifies the amplification of the optoelectronic converter and/or of a downstream amplifier until the control deviation is zero. The control signal value required for this is stored for the duration of the document scanning that follows the calibration phase. For white balancing in color scanners, the control means is expanded to the three color channels.

The known method has the disadvantage that in the white balance a corresponding white point on the image original to be reproduced must always be approached with the scan unit, which is time-consuming and imprecise, in particular in case of repetitions of the white balance. In addition, it is often the case that there is no bright image point suitable for use as a white point in a color document.

A further method for white balance for black/white scanners and for color scanners is indicated in EP-A-0 281 659, in which the repeated approaching of a white point on an image original to be reproduced with the scan unit is avoided. For this purpose, when white balancing takes place for the first time, a light attenuation factor is determined by means of optoelectronic scanning of the white point. In repetitions of the white balance, the scan light representing the white point is simulated by the attenuated light of the scan light source, without renewed white point scanning in the image original, whereby the light attenuation occurs by means of an iris diaphragm controlled by the determined light attenuation factor.

The known method is based on a color-neutral density simulation, which is not always given in practice, and can thus sometimes lead to unsatisfactory results.

In black/white scanners for scanning opaque documents, it is also already known to use for the white balance not the brightest point of the opaque document, but rather the reference white of a balance strip, which, in a conventional white balance, must be at least as bright as the brightest point of the opaque document. If, for example, the reference white is darker than the brightest point in the opaque document, and the white level is set to the reference white of the balance strip, there results in the later scanning of the brightest point in the opaque document a signal limitation to the white level, and a loss of information results. Since the reference white of the balance strip changes due to yellowing and soiling, balance errors can disadvantageously result. In order to avoid such balance errors, it has been necessary up to now to replace the balance strip from time to time.

SUMMARY OF THE INVENTION

An object of the present invention is to improve a method for white balance in a scanning apparatus for point-by-point and line-by-line optoelectronic scanning of image originals in such a way that it can be carried out with a low time expense, without loss of information, in order to achieve a good reproduction quality.

This object is solved by means of the features of claim 1.

DESCRIPTION OF THE PREFERRED EMBODIMENTS

Figure 1:
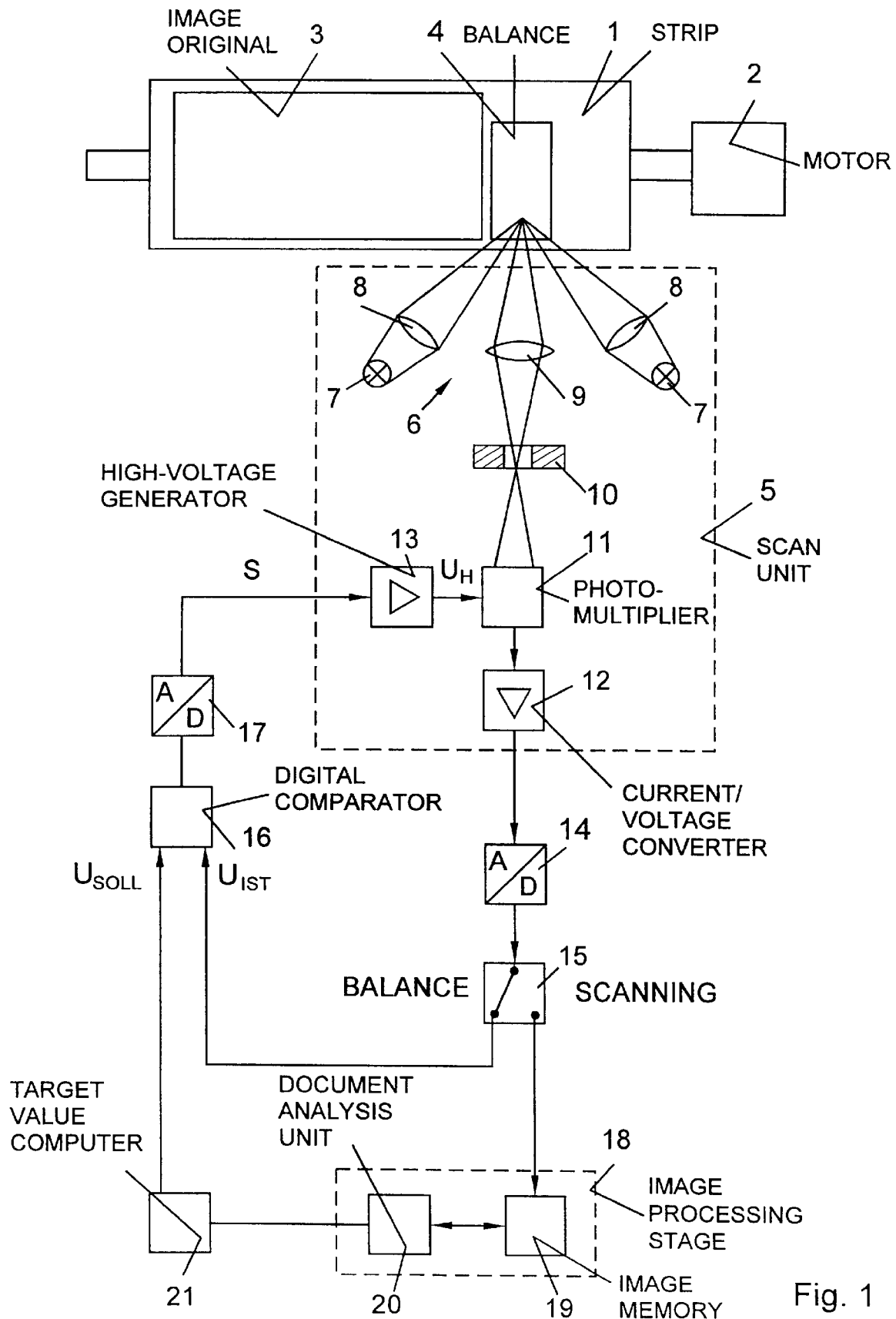
FIG. 1 shows a block circuit diagram of the design of an apparatus for carrying out a white balance in a black/white scanner.

FIG. 1 shows a block circuit diagram of the design of an apparatus for carrying out a white balance in a black/white scanner. A scan drum (1) of a black/white scanner (not shown in more detail) is rotationally driven by a motor (2). On the scan drum (1), an image original (3) to be scanned is arranged in the form of an opaque document, and next to it a balance strip (4) with a reference white for a white balance is arranged. As a balance strip, normal paper with average brightness can, for example be used. In the scanning of the document, the image original (3) is scanned image-point-by-image-point and line-by-line by an optoelectronic scan unit (5) that moves along the scan drum (1) in the axial direction.

For the point-by-point illumination of the image original (3), a scan illumination apparatus (6) having two light sources (7) and two optical systems (8) is located in the scan unit (5).

The scan light reflected by the image original (3), which light is modulated corresponding to the brightnesses of the [. . . ] in the scanned image points, flows into the scan unit (5). The scan light is there focused on a scan diaphragm (10) using a scan lens (9), and flows to a light/voltage converter means having a photomultiplier (11) and a current/voltage converter (12) connected downstream, in which the output current of the photomultiplier (11) is converted into an analog image signal. The amplification of the photomultiplier (11) is controlled via the high voltage UHI which is produced in a high-voltage generator (13) that can be controlled by a control signal S. The analog image signal produced in the current/voltage converter (12) is digitized into image values in an A/D converter (14) with a signal saturation range from zero up to a maximum voltage $U_{max}$.

After a logarithmization, the image values are a measure of the densities of the scanned image points in the image original (3) or for the density of the reference white of the balance strip (4).

A changeover switch (15) with the switch settings "balance" and "scan" is connected downstream from the A/D converter (14).

During a white balance of the black/white scanner, the changeover switch (15) is in the switching position "balance," in which the scan unit (5) is positioned above the balance strip (4). The image value obtained by measuring the reference white is supplied, as a voltage actual value $U_{IST}$, to a first input of a digital comparator (16), in which the voltage actual value $U_{IST}$ is compared with a voltage target value $U_{SOLL}$ that is adjacent to a second input of the digital comparator (16). Via a downstream D/A converter (17), the result of the comparison is converted into the control signal S for the high-voltage generator (13).

During the document scanning, the changeover switch (15) is in the "scan" switch position, in which the image values obtained by means of point-by-point and line-by-line scanning of the image original (3) are supplied to an image processing stage (18) for further processing. The image processing stage (18) consists of an image memory (19) and a document analysis unit (20) that communicates with the image memory (19). In the document analysis unit (20), the density $D_{WP}$ of the white point, the brightest point in the image original (3), is determined from the image values of the image original (3) stored in the image memory (19).

The white point density $D_{WP}$ determined in the document analysis unit (20) is handed over to a target value computer (21), in which the voltage target values $U_{SOLL}$ for the white balance are calculated.

In the white balance, before the actual scanning of the image original (3) the amplification of the light/voltage converter means (11, 12) is set by means of a comparison of voltage actual values $U_{IST}$ and voltage target values $U_{SOLL}$ in such a way that the scan unit (5) produces a maximum image value during the later scanning of the white point of the image original (3), said maximum value corresponding to a predetermined white level $U_{WP}$. For the full exploitation of the saturation range of the A/D converter (14), the white level $U_{WP}$ is usefully set to the maximum voltage $U_{MAX}$ of the saturation range.

Figure 2:
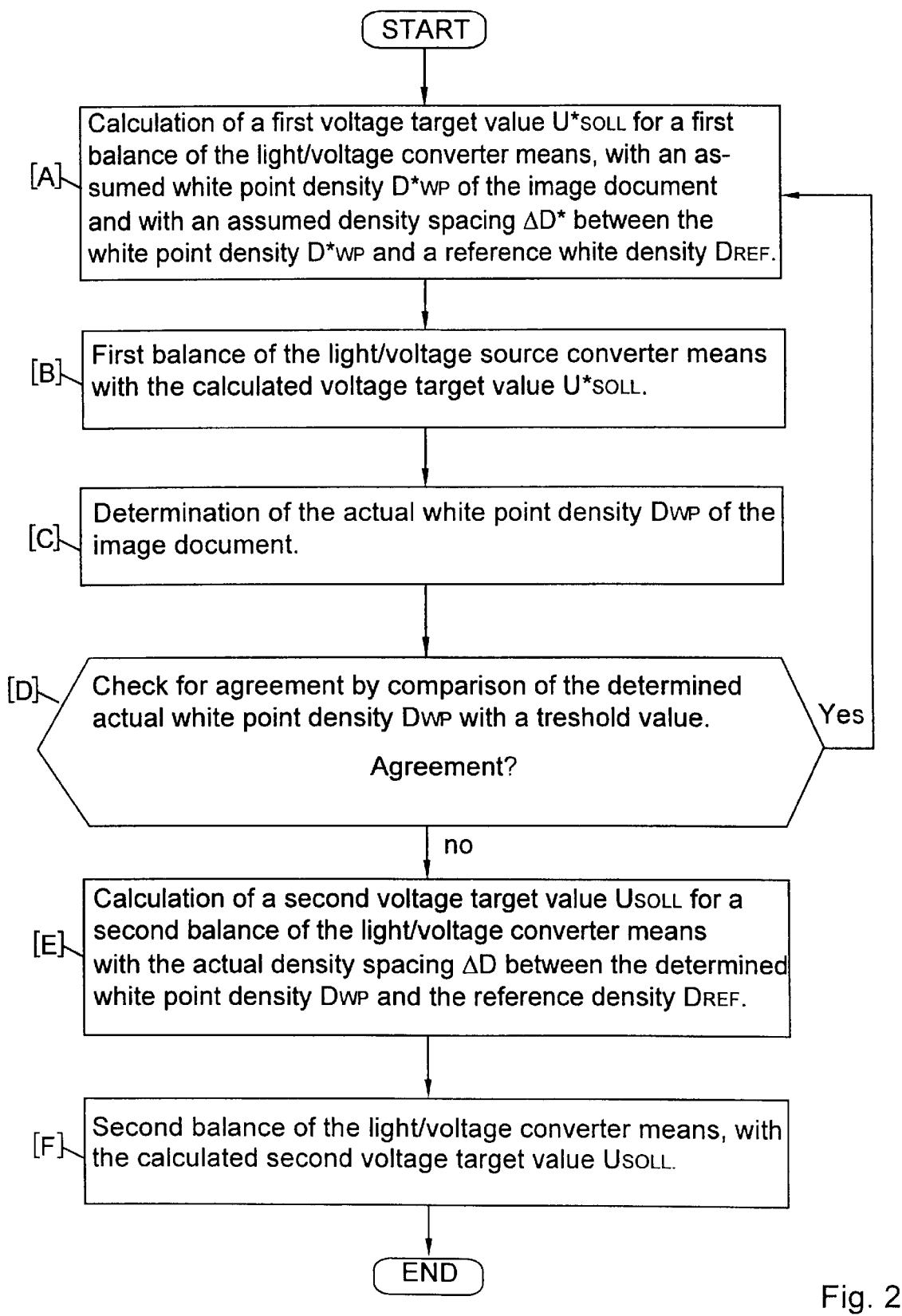
FIG. 2 shows a flow diagram for the white balance method.

The inventive method for white balance is subsequently explained in more detail on the basis of the method steps [A] to [F], shown in FIG. 2 in the form of a flow diagram.

In the inventive method for white balance, a "superwhite" is produced as a reference white, using the balance strip (4). By means of the simulation of a "superwhite," a balance strip (4) with a lower brightness than the brightest point of the image original (3) can advantageously be used, whereby changes in brightness in the balance strip (4) due to yellowing and soiling have only a very small influence on the quality of the white balance.

In a method step [A], a first voltage target value $U^*_{SOLL}$ is calculated in the target value computer (21) for a first balancing of the light/voltage converter means (11, 12).

For the calculation of the first voltage target value $U^*_{SOLL}$, an assumed white point density $D^*_{WP}$ of the image original (3) is first predetermined, for example the white point density $D^*_{WP}=0$, an assumed density spacing $\Delta D^*$ between the unknown reference white density $D_{REF}$ of the balance strip (4) and the white point density $D^*_{WP}$ according to equation [1] is predetermined, and the white level $U_{WP}$ is predetermined.

$$\Delta D^* = (D^*_{REF} - D^*_{WP}) \qquad [1]$$

The first voltage target value $U^*_{SOLL}$ is calculated according to equation [2] as follows.

$$U^*_{SOLL} = U_{WP} \times 10 \exp.(-\Delta D^*) \qquad [2]$$

with $U_{WP}$=white level, and $\Delta D^*$=assumed density spacing

In a method step [B], a first balance of the light/voltage converter means (11, 12), using the first voltage target value $U^*_{SOLL}$ calculated in method step [A], is carried out in the scanning of the reference white of the balance strip (4) with the scan unit (5). The first balance is carried out in such a way that at the reference white density $D_{REF}$, which results due to the assumed density spacing $\Delta D^*$, a voltage value corresponding to the calculated first voltage target value $U^*_{SOLL}$ is produced, and at the assumed white point density $D^*_{WP}$, the white level $U_{WP}$ is produced.

For this purpose, the first voltage target value $U^*_{SOLL}$ calculated in the target value computer (21) is given to the second input of the digital comparator (16). The scan unit (5) is positioned over the balance strip (4), and the voltage actual value $U_{IST}$, produced by measuring the reference white of the balance strip (4), flows via the changeover switch (15)—in the "balance" switch position—to the first input of the digital comparator (16). Dependent on the sign of the control signal S, the gain of the photomultiplier (11) is raised or lowered via the high voltage $U_H$ until, at the control signal S =0, the voltage actual value $U_{IST}$ is equal to the first voltage target value $U^*_{SOLL}$. The amplification of the photomultiplier (11) achieved at the control signal S is held constant by storing a corresponding high-voltage value in the high-voltage generator (13) until a next balance.

The voltage value U set in the first balance of the light/voltage converter means (11, 12) represents the assumed density spacing $\Delta D^*$ or, respectively, the reference white density $D_{REF}$ of the balance strip (4).

In a method step [C], the actual white point density $D_{WP}$ of the image original (3) is determined with the first balance—carried out in method step [B]—of the light/voltage converter means (11, 12).

The actual white point density $D_{WP}$ can be defined by manual densimetric measurement of the white point of the image original (3) with the scan unit (5), or by an automatic analysis of the image perimeter of the image original (3), using the image values obtained by point-by-point and line-by-line scanning of the image original (3).

For the automatic analysis of the image perimeter, the scan unit (5) first scans the image original point-by-point and line-by-line. The image values thereby obtained are stored in the image memory (19) via the changeover switch (15) in the "scanning" switch position. In the document analysis unit (20), the actual white point density $D_{WP}$ of the image original (3) is determined on the basis of the image values stored in the image memory (19), and is given to the target value computer (21).

The document analysis can for example take place according to DE-A-43 09 879. The image values for the document analysis can be obtained by means of a fine scanning or by means of a rough scanning of the image original (3). In the fine scanning, the image original (3) is scanned with the scanning fineness required for the reproduction, and in the rough scanning the document is scanned with a correspondingly rougher scanning fineness and a scanning diaphragm that is enlarged in relation to the normal scanning diaphragm (10).

In a method step [D], an overload check is carried out in order to prevent overload of stages connected downstream from the light/voltage converter means (11, 12), e.g. of the A/D converter (14).

The overload check takes place in the target value computer (21), by comparing the actual white point density $D_{WP}$ calculated in method step [C] with a decision threshold that corresponds to the assumed white point density $D^*_{WP}=0$.

The overload check serves to determine whether the actual white point density $D_{WP}$ of the image original (3) has a smaller or larger density spacing $\Delta D$ than the density spacing $\Delta D^*$ assumed in method step [A].

In the comparison of the actual white point density $D_{WP}$ with the assumed white point density $D^*_{WP}=0$, it is checked whether the actual white point density $D_{WP}$ is greater than or equal to the assumed white point density $D^*_{WP}=0$.

If $D_{WP}>0$, there is no overload, and method step [E] follows.

If $D_{WP}=0$, the actual white point of the image original (3) can have the assumed white point density $D^*_{WP}=0$, or else can be brighter than the reference white of the balance strip (4) by the assumed density spacing $\Delta D^*$, and an overload would be the result, with loss of information in the document scanning.

In order to avoid an overload due to a faulty white balance, the density spacing $\Delta D^*$ assumed in method step [A] is increased step-by-step, and, with the density spacings $\Delta D^*$ corrected in this way, the method steps [A] to [D] are respectively run through again in routines until $D_{WP}>0$. By means of suitable selection of the corrected assumed density spacings $\Delta D^*$, the number of routines run through can be minimized. For an assumed density spacing $\Delta D^*=0.10$, the density spacing $\Delta D^*$ can for example be increased step-by-step by 0.05, so that the routines are run through successively with the density spacings $\Delta D^*=0.10$, $\Delta D^*=0.15$, $\Delta D^*=0.20$, etc.

A method step [E] follows the overload check.

In the method step [E], the actual density spacing $\Delta D$ between the reference white density $D_{REF}$ and the actual white point density $D_{WP}$ of the image original (3) is defined according to equation [3], and the first voltage target value ($U^*_{SOLL}$) is corrected to a second voltage target value $U_{SOLL}$ for a second balance of the light/voltage converter means (11, 12) according to equation [4].

$$\Delta D=(D_{REF}-D_{WP}) \qquad [3]$$

With the actual density spacing $\Delta D$, there results according to equation [4] the second voltage target value $U_{SOLL}$ for the second balance of the light/voltage converter means (11, 12):

$$U_{SOLL}=U_{WP}\times 10 \exp.(-\Delta D) \qquad [4]$$

In a method step [F], the second balance of the light/voltage converter means (11, 12) is then carried out with the second voltage target value $U_{SOLL}$ determined in method step [E], with a new scanning of the reference white of the balance strip (4) with the scan unit (5). By means of the second balance, a displacement of the determined actual density spacing $\Delta D$ is carried out in such a way that at the reference white density $D_{REF}$, which results due to the shifted actual density spacing $\Delta D$, a voltage value corresponding to the calculated second voltage target value $U_{SOLL}$ is produced, and at the actual white point density $D_{WP}$, which coincides with the assumed white point density $D^*_{WP}=0$ due to the displacement of the density spacing $\Delta D$, a voltage value corresponding to the white level $U_{WP}$ is produced.

The second balance runs as described in method step [B]. After the second balance, the white balance of the black/white scanner is concluded, and the actual scanning of the image original (3) for the reproduction can begin.

In the following, two examples of a white balance are indicated and are explained on the basis of graphic representations.

EXAMPLE 1

In method step [A], let the assumed white point density $D^*_{WP}=0$, the assumed density spacing $\Delta D^*=0.10$, and the white level $U_{WP}=6$ V. In this case, the white point of the image original (3) would be brighter by the density 0.10 than the reference white of the balance strip (4). The first voltage target value for the first balance then results according to equation [1] as $U^*_{SOLL}=6\times 10 \exp.(-0.10)=4.77$ V. After the first balance according to method step [B], the voltage U=4.77 V represents a reference white density $D_{REF}=0.10$.

In method step [C], suppose that the actual white point density $D_{WP}=0.03$ has been determined. In this case, the actual white point of the image original (3) is darker by the density 0.03 than the assumed white point with the density $D^*_{WP}=0$. There thus results a smaller density spacing $\Delta D=(D_{REF}-D_{WP})=0.10-0.03=0.07$ of the actual white point of the image original (3) from the reference white of the balance strip (4) than the assumed density spacing $\Delta D^*=0.10$.

The overload check according to method step [D] yields the result that at the determined actual white point density $D_{WP}=0.03$ of the image original (3) there is no overload, since $D_{WP}>0$.

According to method step [E], the second voltage target value for the second balance with the actual density spacing $\Delta D=0.07$ is calculated as $U_{SOLL}=6\times 10 \exp.(-0.07)=5.11$ V. After the second balance according to method step [E], a displacement of the actual density spacing $\Delta D$ ensues in such a way that the assumed white point density $D^*_{WP}=0$, and thus the white level $U_{WP}=6$V, is now allocated to the actual white point density $D_{WP}=0.03$.

Figure 3A:
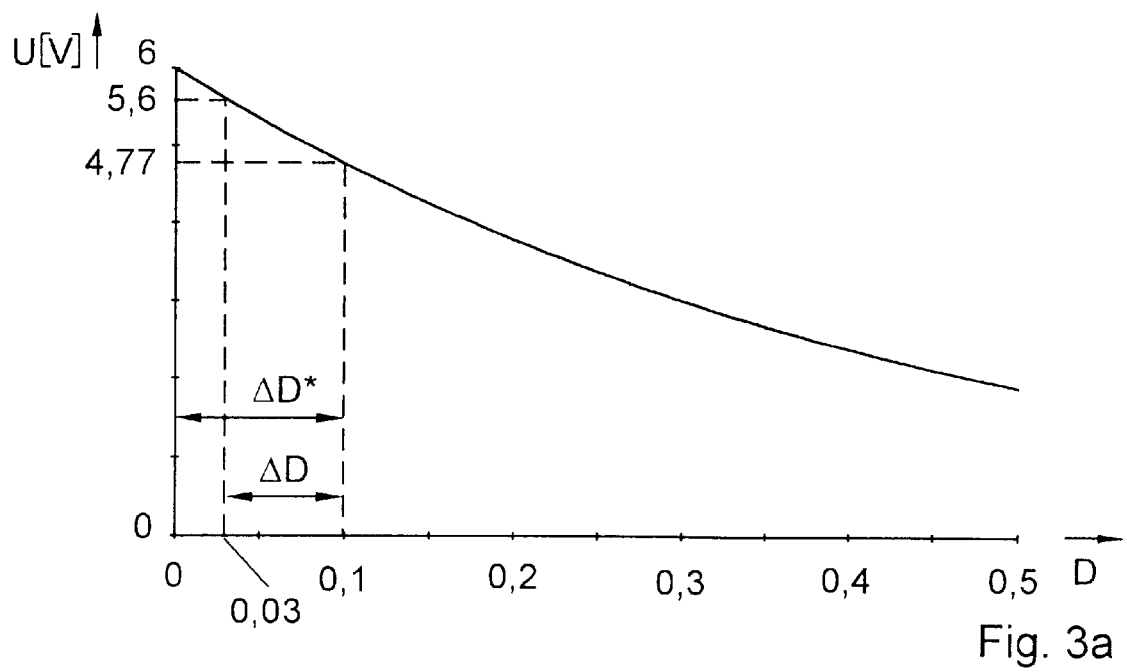
FIG. 3 shows a graphic representation.

FIG. 3a shows, in a graphic representation, the function U=f(D) after the first balance with the assumed density spacing of $\Delta D^*=0.10$. The first balance ensued in such a way that the voltage $U=4.77$ V at the reference white density $D_{REF}=0.10$ is smaller than the predetermined white level $U_{WP}=6$V, and that the voltage U at the assumed white point density $D^*_{WP}=0$ corresponds to the white level $U_{WP}=6$V. At the same time, the determined actual white point density $D_{WP}=0.03$ of the image original (3), and of the smaller density spacing $\Delta D=0.07$ resulting therefrom, is entered. It can be seen that at the actual white point density $D_{WP}=0.03$, the white level $U_{WP}=6$V is not achieved; rather, a smaller voltage $U=5.60$ V is achieved, so that the available overload range up to $U_{WP}=6$V is not fully used.

Figure 3B:
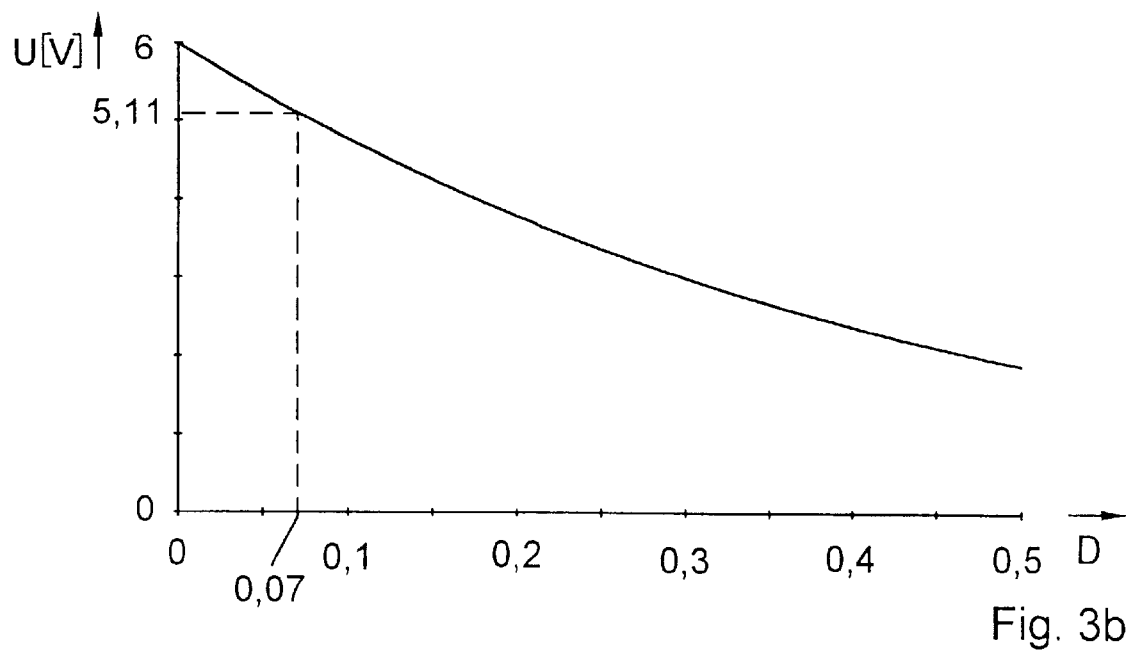

FIG. 3b shows, in a further graphic representation, the function $U=f(D)$ after the second balance, by means of which, due to the displacement of the actual density spacing $\Delta D=0.07$, it was achieved that the assumed white point density $D^*_{WP}=0$, and thereby the white level $U_{WP}=6$V, is now allocated to the actual white point density $D_{WP}=0.03$, by which means a full saturation is ensured.

EXAMPLE 2

In the method step [A], again let the assumed white point density $D^*_{WP}=0$, the assumed density spacing $\Delta D^*=0.10$, and the white level $U_{WP}=6$ V. The first voltage target value for the first balance then likewise results as $U^*_{SOLL}=6\times10$ exp. $(-0.10)=4.77$ V.

In method step [C], assume that the actual white point density $D_{WP}=0$ has been determined. A density spacing $\Delta D=0$, or else a greater density spacing $\Delta D$, thereby results.

The overload check according to method step [D] yields the result that in the determined actual white point density $D_{WP}=0$ of the image original (3) there is an overload, since $D_{WP}=0$.

In this case, method steps [A] to [D] are repeated. For this purpose, the assumed density spacing $\Delta D^*=0.1$ is raised by e.g. 0.05 to 0.15, and, using the increased density spacing $\Delta D^*=0.15$, a new voltage target value is calculated as $U_{SOLL}=4.25$ V. Using this new first voltage target value $U_{SOLL}=4.25$ V, a new first balance is carried out, and the new actual white point density D is subsequently determined, e.g. as $D_{WP}=0.02$. In the overload check, it now results that there is no longer an overload, since $D_{WP}=0.02>=0$. After the overload check, the second voltage target value is then calculated for the second balance with the actual density spacing $\Delta D=0.15-0.22=0.13$, as $U_{SOLL}=6\times10$ exp. $(-0.13)=4.45$ V, and the second balance is carried out.

Figure 4A:
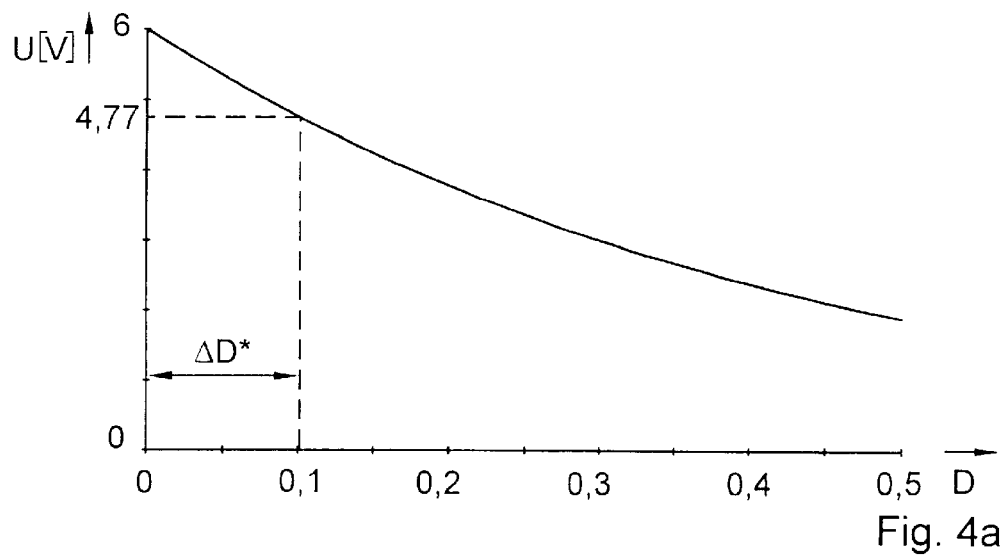
FIG. 4 shows a further graphic representation.

FIG. 4a shows the function $U=f(D)$ after the first balance with the assumed density spacing of $\Delta D^*=0.10$. The first balance ensued in such a way that at the reference white density $D_{REF}=0.10$, the voltage $U=4.77$ V is smaller than the predetermined white level $U_{WP}=6$V, and that at the assumed white point density $D^*_{WP}=0$, the voltage U corresponds to the white level $U_{WP}=6$V. At the same time, the determined actual white point density $D_{WP}=0$ is entered.

Figure 4B:
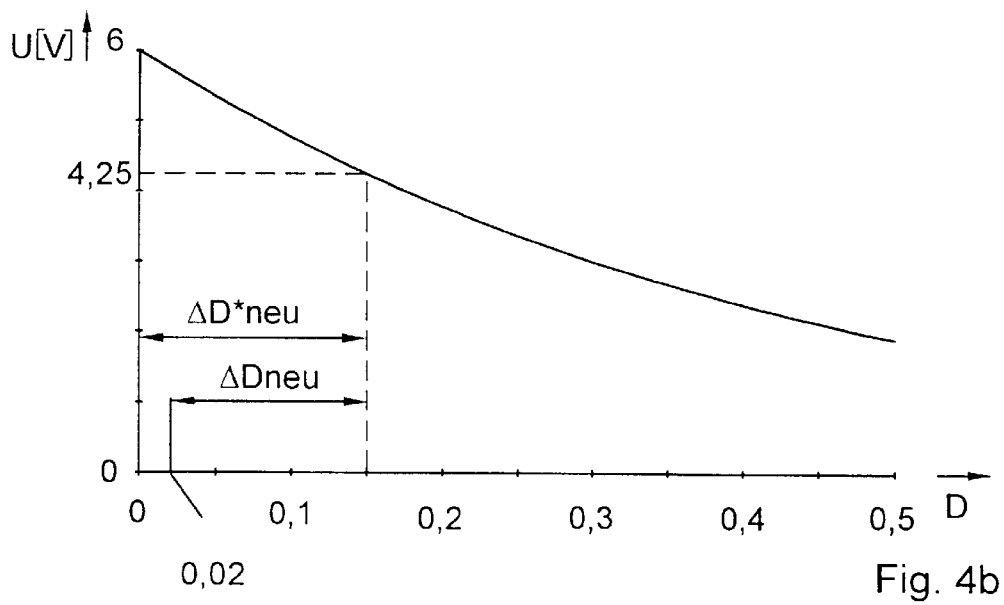

FIG. 4b shows the function $U=f(D)$ after the first balance, repeated due to the overload check, with an increased density spacing $\Delta D=0.15$ and the accordingly determined new actual white point density $D_{WP}=0.02$.

Figure 4C:
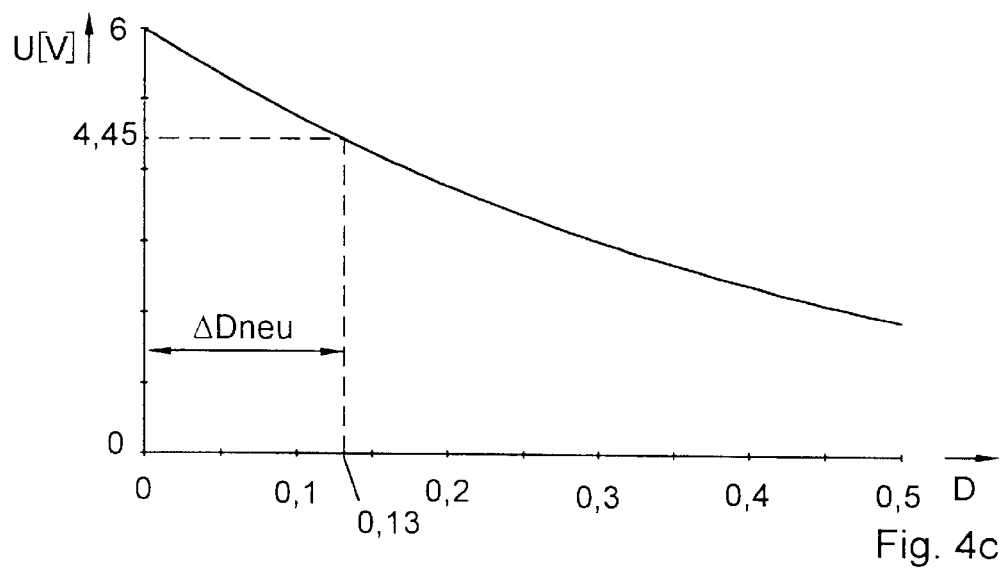

FIG. 4c shows the function $U=f(D)$ after the second balance. By means of the second balance, it was achieved on the basis of the displacement of the actual density spacing $\Delta D=0.13$ that the assumed white point density $D^*_{WP}=0$, and thereby the white level $U_{WP}=6$ V, is now allocated to the actual white point density $D_{WP}=0.02$.

It is within the scope of the invention to use the white balance method described for a black/white scanner in a color scanner as well. In this case, the individual method steps are to be applied to each of the color channels.

We claim as our invention:

1. A method for a white balance of an optoelectronic scan unit for image-point-by-image-point and line-by-line scanning of an image original and for a conversion in a light/voltage converter unit of a scan light, modulated with densities of scanned image points, into image values, comprising the steps of:

predetermining a density of a brightest point of the image original as a white point, and a density spacing $\Delta D^*$ between a density of a reference white and the density of the white point of the image original;

from the predetermined density spacing $\Delta D^*$ and from a predetermined voltage level $U_{WP}$ which is supposed to achieve an image value in scanning of the white point of the image original, calculating a first voltage target value $U^*_{SOLL}$ for a first balance of the light/voltage converter unit according to the equation $$U^*_{SOLL}=U_{WP}\times10 \text{ exp.}(-\Delta D^*),$$

carrying out the first balance by measuring the reference white with the optoelectronic scan unit, and setting an image value produced by a measurement to the calculated first voltage target value $U^*_{SOLL}$ by modifying an amplification of the light/voltage converter unit;

using the scan unit, determining an actual white point density of the image original, at the amplification set in the first balance of the light/voltage converter unit;

determining an actual density spacing $\Delta D$ between the reference white density and the actual white point density of the image original, and correcting the first voltage target value $U^*_{SOLL}$ corresponding to the actual density spacing to a second voltage target value $U_{SOLL}$ for a second balance of the light/voltage converter unit according to the equation $$U_{SOLL}=U_{WP}\times10 \text{ exp.}(-\Delta D); \text{ and}$$

carrying out the second balance by again measuring the reference white density with the scan unit, and setting the image value produced by the measurement of the calculated second voltage target value $U_{SOLL}$ by modifying the amplification of the light/voltage converter unit.

2. The method according to claim 1 wherein a balance strip of a medium brightness is used as the reference white density.

3. The method according to claim 2 wherein a normal paper is used as the balance strip.

4. The method according to claim 1 wherein the predetermined white point density is zero.

5. The method according to claim 1 wherein the actual white point density of the image original is determined by measuring the white point, the brightest point of the image original, with the scan unit.

6. The method according to claim 1 wherein:

the image original is scanned image-point-by-image-point and line-by-line, and the image values are stored; and the actual white point density is determined by an automatic document analysis, based on the stored image values.

7. The method according to claim 6 wherein the image original is scanned with a scanning fineness that is rougher in relation to the normal scanning fineness.

8. The method according to claim 1 wherein:

the actual white point density of the image original is compared with a decision threshold;

if the actual white point density of the image original is greater than the decision threshold, the second balance is carried out, and if the actual white point density of the image original is equal to the decision threshold, repeating the steps of predetermining the density of the brightness point through the step of determining the actual white point density using the predetermined density spacing that is increased step-by-step until the actual white point density of the image original is greater than the decision threshold.

9. The method according to claim 8 wherein the decision threshold of the white point density corresponds to zero.

10. The method according to claim 1 wherein the method for white balance is applied to each of color channels of a color scanner for point-by-point and line-by-line optoelectronic scanning of color image originals.

11. A method for a white balance of an optoelectronic scan unit for scanning of an image original and for a conversion in a light/voltage converter unit of a scan light, modulated with densities of scanned image points, into image values, comprising the steps of:

predetermining a density of a brightest point of the image original as a white point, and a density spacing $\Delta D^*$ between a density of a reference white and the density of the white point of the image original;

from the predetermined density spacing $\Delta D^*$ and from a predetermined voltage level $U_{WP}$ which is to achieve an image value in scanning of the white point of the image original, calculating a first voltage target value $U^*_{SOLL}$ for a first balance of the light/voltage converter unit based on $U_{WP}$ and $\Delta D^*$;

carrying out the first balance by measuring the density of the reference white with the optoelectronic scan unit, and setting an image value produced by measurement of the calculated first voltage target value $U^*_{SOLL}$ by modifying an amplification of the light/voltage converter unit;

using the optoelectronic scan unit, determining an actual white point density of the image original, at the amplification set in the first balance of the light/voltage converter unit;

determining an actual density spacing $\Delta D$ between the reference white density and the actual white point density of the image original, and correcting the first voltage target value $U^*_{SOLL}$ corresponding to the actual density spacing to a second voltage target value $U_{SOLL}$ for a second balance of the light/voltage converter unit based on $U_{WP}$ and $\Delta D^*$;

carrying out the second balance by again measuring the reference white density with the scan unit, and setting the image value produced by the measurement of the calculated second voltage target value $U_{SOLL}$ by modifying the amplification of the light/voltage converter unit.

* * * * *